Nov. 2, 1954 K. B. CZARNECKI ET AL 2,693,017
PROCESS OF PRODUCING LIGHTWEIGHT AGGREGATES
Filed April 19, 1951 2 Sheets-Sheet 2

INVENTOR
KAMIL B. CZARNECKI
GEORGE A. BOLE
BY
Jerome R. Box
ATTORNEY

United States Patent Office 2,693,017
Patented Nov. 2, 1954

2,693,017

PROCESS OF PRODUCING LIGHTWEIGHT AGGREGATES

Kamil B. Czarnecki, London, England, and George A. Bole, Columbus, Ohio, assignors, by mesne assignments, to The Ohio State University Research Foundation, Columbus, Ohio, a corporation of Ohio Application April 19, 1951, Serial No. 221,816

3 Claims. (Cl. 25—156)

The invention disclosed in this application relates to the production of lightweight aggregate from certain clays, shales, silts, slates, or mixtures of two or more of them, or from similar raw materials and to the lightweight aggregate so produced.

Prior hereto the use of oil has been mentioned for the purpose of providing some additional fuel inside the clay body and mention had been made in certain cases of the use of hydrocarbon oil as a means of separating one pebble of the aggregate from another and thus as a means of aiding in preventing the sticking problem. Oil has also been mentioned as a source of an additional amount of carbon in the clay body. It has also been suggested that rounded pebbles might be obtained in a rotary kiln. Nevertheless the majority of the lightweight aggregates have a very angular and sharp shape. Even when an attempt is made to form rounded pebbles in a rotary kiln, the diameter, exact shape, etc., cannot possibly be accurately controlled.

One of the objects of our invention is the production of a lightweight aggregate with a strong oxidized outer shell, ideally rounded shape, and an interior expanded so as to decrease the specific gravity of the aggregate.

Another object of our invention is the production of lightweight aggregate using a wide variety of clay-like materials.

A further object of our invention is the production of lightweight aggregate by means of the use of crude oil as a source of expansion gases and of heat at the same time.

A further object of our invention is the production of lightweight aggregate having a substantially sealed substantially impermeable outer shell in which the strength and thickness of the load bearing shell can be predetermined and controlled so as to provide aggregate useful in all types of construction from very strong material for dam construction, etc. to very light weight material useful for insulation, etc. It should be pointed out here that even with a substantially sealed substantially impermeable outer shell such lightweight aggregate may show some absorption of water. However, in producing our lightweight aggregate with such substantially sealed substantially impermeable outer shell, we produce such material having an absorption of not substantially greater than ten per cent and preferably of less than ten per cent which we define as substantially sealed, substantially impermeable.

A further object of our invention is the forming of each pebble of the aggregate into an ideally rounded sphere.

A further object of our invention is the production of a lightweight aggregate which has a very dense, hard, and substantially impermeable oxidized outer shell.

Further objects and features of our invention will be apparent from the subjoined specification and claims when considered in connection with the accompanying drawings which illustrate several embodiments of our invention.

Figure 1:
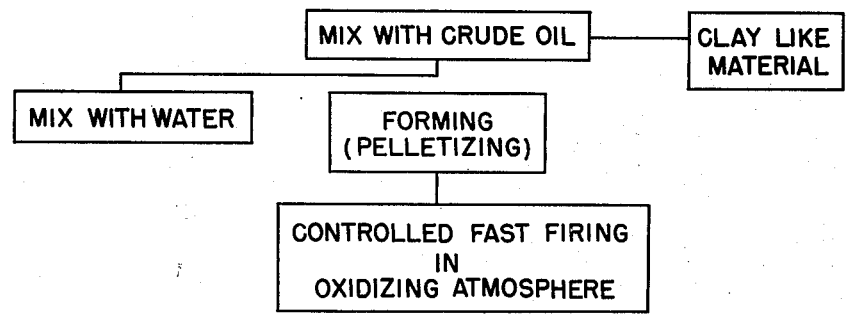
Fig. 1 is a diagrammatic view showing the steps of a process which comprises one embodiment of our invention.
Figure 2:
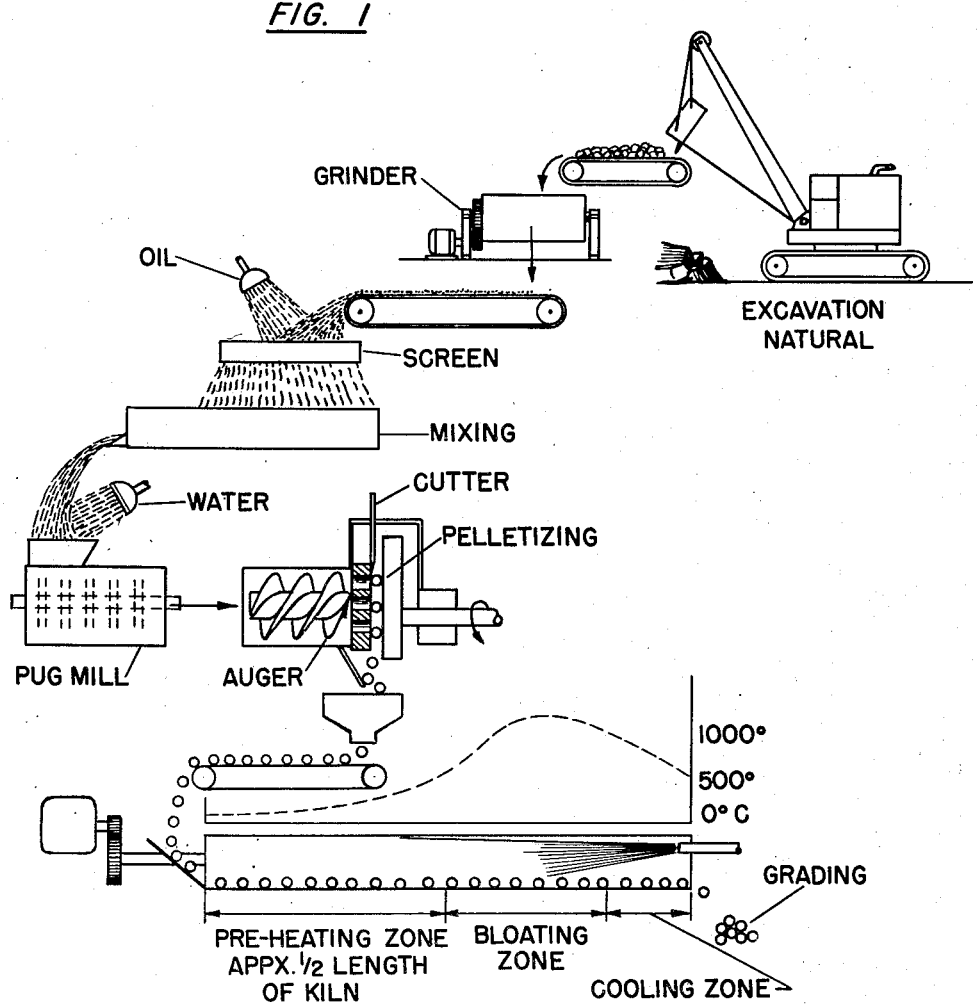
Fig. 2 is a diagrammatic view showing in more detail than Fig. 1 the steps of a process comprising another embodiment of our invention.
Figure 3:
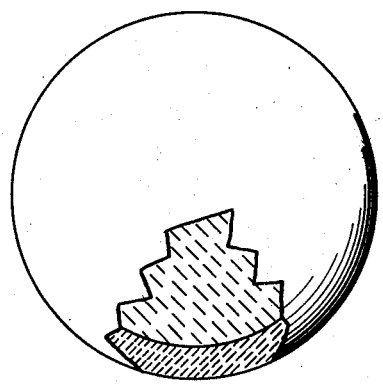
Fig. 3 is a view on an enlarged scale, partially in elevation, and partially in section of a rounded pebble of lightweight aggregate formed by the process of our invention and comprising a product of our invention.
Figure 4:
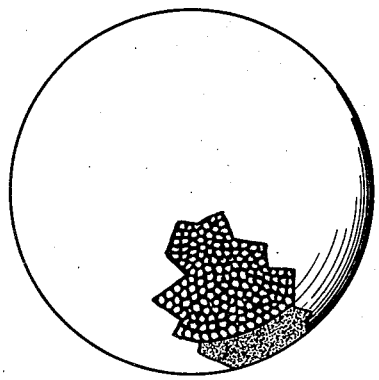
Fig. 4 is a view similar to Fig. 3 but showing in the sectional portion thereof the product more as it actually appears, when a portion of the pellet is broken or sheared off.

According to our process, the production of lightweight aggregate consists as shown in Fig. 1 of the steps of taking natural clay-like materials and mixing them with crude oil (or an oil emulsion), thereafter mixing it with water (or additional water if desired), thereafter forming it into pellets of the desired size and shape and thereafter firing in an oxidizing atmosphere. As is indicated in Fig. 2, it is usually necessary to grind the clay-like materials before mixing with the crude oil in order to reduce the size to the required degree of fineness. The clay-like materials which we desire to use comprise clays, silts, shales, slates and similar raw materials. The crude oil which we desire to use are hydrocarbon oils which boil at relatively high temperatures as compared to gasoline and kerosene and inasmuch as unrefined petroleum and certain sometimes unused fractions thereof have suitable average boiling points and are relatively inexpensive they will probably usually be used in the commercial practice of our invention. We propose to use cheap oils. We hereby define "clay-like materials" for use in this specification and claims to comprise the usable clays, silts, shales, schists, slates and similar raw materials.

As shown in Fig. 2 our process may consist of the following ten steps:

1. Excavation of raw material;
2. Grinding or crushing and screening (when necessary);
3. Addition of oil;
4. Addition of water;
5. Extruding and cutting into slugs of the desired size;
6. Forming into pellets of rounded shape;
7. Preheating;
8. Bloating (i. e. firing or burning);
9. Cooling; and
10. Grading.

Many of the above steps are similar to those used in many other lines of the ceramic industry. We believe, however, that one or more of these steps are entirely new in ceramic processes and that steps 2 to 9, inclusive, have never before been used in the exact detail order and combination in which we use them, in the production of lightweight aggregates. Such steps will be described in detail in this application.

It is necessary according to our process to have the raw materials ground to 20-mesh and finer by one of the usual methods unless the raw materials are naturally satisfactory in this respect.

Once the raw material is sized to the required degree, the addition of crude oil may take place by spraying oil over the dry screened raw material. The oil may be added if desired while grinding. The amount of oil added varies according to the nature of the raw material, but generally speaking, it should be between 2 and 5% by weight of the raw material. Finely ground raw materials readily absorb crude oil and therefore the proper mixing and distribution of the crude oil must be assured. Oil is added not primarily as a fuel, but as a source of considerable amount of gases which when evolved during the firing will expand appreciably the volume of the pyroplastic pebble. A portion of the added oil is not burned out, but is reduced to coke. This coke causes the final expansion. The pressure of gases will expand any clay-like body when heated to the semi plastic state. In the case of clay which, due to its natural organic mixtures (impurities), would expand readily by itself, this addition of crude oil will provide an additional amount of gases which, under proper heat treatment, will expand each pebble of clay to a sufficient degree at a much lower temperature, thus making it possible to save considerable amount of fuel during the burning in the kiln and possible also to prolong the life of the refractory lining of the kiln. The introduction of crude oil could be carried out in many ways, one method being to spray the oil from an atomizer onto the dry, screened clay. The use of an atomizer over a dry pan is suggested as a satisfactory method for this operation. We prefer to add no water until after the oil has been added and distributed and absorbed. However, it may be possible that the oil may be added as an emulsion with water and thereafter additional water may be added if required or the subsequent water mixing step may be omitted if sufficient water can be added in an emulsion.

It is a known fact that oil does not mix well with water. This is a reason that under our process we greatly prefer the crude oil be introduced, uniformly distributed and absorbed by the screened dry clay before any water is added. The amount of water added will vary according to the properties of the clay, but generally it should be about 15–20% by weight of the raw material. The important point is that the clay mass should not be too wet, but rather have a heavy plastic consistency which will assure a better forming operation. The above mentioned addition of water may be made in an ordinary pug mill or in similar equipment or may be added in the extrusion machine itself.

After the sticky mass of clay or shale, mixed with crude oil and water has been put through the pug mill it is extruded through a perforated die. Very close to the die there is provided a cutter which separates short cylinders of clay from the extruding mass. As pointed out below we may utilize this step for forming the pellets into substantially rounded pellets.

We have found that a round sphere like shape of the aggregate combined with a strong solid outer shell is a very important property, as it provides the best service in the concrete mix from the point of view of strength, workability, theory of packing and low water absorption. Although this principle may be generally recognized and agreed to, nevertheless a great majority of commercial aggregates have an irregular, angular, sharp and ununiform structure which characteristics are highly detrimental to the aggregate especially in good packing in the resultant concrete. Even the so-called "round" aggregates are only less angular than the others and are not specially formed to a round shape by a special operation provided before forming. For this reason in the case of many existing commercial aggregates there are hardly two pebbles alike in shape. Under our process there is a special forming operation. We have shown in Fig. 2 and describe below two methods and apparatus for doing this. Other processes and apparatus may be used. One method we propose to use can best be compared to forming a round ball from plastic clay (or from snow or dough) by rolling the substance between the hands, moving them eccentrically but parallel to each other. Very close to the cutting plate and opposite and parallel to it is a forming plate which revolves eccentrically. The die and the forming plate can be positioned in a vertical or horizontal attitude or may be at an angle to the vertical or horizontal. The forming plate (due to its rotation) shapes the short extruded cylinders of clay mass into ideally round pebbles. The distance between the die and the forming plate can be adjusted to any required length. If the forming plate is kept at a fixed distance from the die all pebbles produced have the same diameter and thus the aggregate will be produced in one size only. However, when it is desired to produce aggregate of a different size the distance between the cutting plate and the forming plate can be varied so as to vary the size of the aggregate. If it is desired to have aggregate of different sizes in the same batch, the distance between the cutting plate and the forming plate may be changed continuously by the forward and backward movement of the forming plate simultaneously with its eccentric rotation and the aggregate may be produced in many different sizes.

We also propose to extrude the material in a rod through the die against a non-rotating plate to cause the section of the rod which is outside the die to bulge. Then we propose to cut off this section and thus form separate pellets which are substantially round or rounded and which become even more nearly round on firing. Many other methods of forming round, rounded, or substantially round pellets may be used. For certain uses of the aggregate it is preferable that the pebbles should have a size of between about 0.25 cubic inch to about 4.0 cubic inches, although for some uses, much larger sizes of aggregate are advantageously used.

Our aggregate may be fired in an ordinary rotary kiln used for the production of other known lightweight aggregates. It can also be burned in a stationary kiln with moving grates. In some respects the stationary kiln may be more desirable. The operation and the time temperature control in a stationary kiln is much easier than in a rotary kiln. A stationary kiln itself is usually cheaper than a rotary kiln. We emphasize however that regardless of the type of kiln, the firing should be done in an oxidizing atmosphere.

According to our method the time temperature ratios decide the required speed and the degree of expansion of each pebble. A careful adjustment must be made for each different raw material used. The following can be described as average normal conditions of burning when a certain rotary kiln was used in forming lightwenght aggregate from certain clays:

(a) The length of the kiln should be about 75–100 feet and the diameter 6–8 feet;

(b) The oxidizing atmosphere must be maintained throughout the whole kiln;

(c) The speed of rotation of the kiln should be controlled by the pyro behavior of the raw material in the kiln but generally the speed should be between 2 and 5 rotations a minute;

(d) Gas or oil should be used but when necessary powdered coal would provide satisfactory results;

(e) The temperature gradients should be carefully adjusted and should, as nearly as possible, be similar to the character and the curve shown in Fig. 2 wherein the preheating period was about 15 minutes, the bloating period about 10 minutes and the cooling period about 5 minutes;

(f) Excess of heat should be avoided. The maximum temperature in the firing zone under average conditions should be between 1000° C. and 1260° C. The high percentage of crude oil added reduces the maximum temperature by about 100° C. which means a considerable saving in the amount of fuel necessary to fire the kiln and adds to the life of the kiln lining;

(g) The speed of movement of the whole mass of pebbles along the kiln should be coordinated with the temperature gradient. Both should be able to be adjusted when necessary. Under average conditions the time necessary for pebbles to move the entire length of the kiln will be between 18 and 30 minutes, depending upon the natural pyro behavior of the raw materials used under this particular heat treatment;

(h) The well known and very difficult problems (1) of the sticking of the whole mass of the aggregate to the interior wall of the kiln, and (2) of the sticking of particles of the aggregate to each other, will, under our process, be substantially avoided due to the following factors:

(1) The ideally rounded shape of the pebbles;

(2) The process of substantially sealing the surface of the pebble at a much lower temperature than has been required under other processes;

(3) A faster rotation of the kiln may in some cases be used as a preventative.

In general the preheating period should be from about 15 minutes to 20 minutes, the bloating period should be from about 5 minutes to about 10 minutes, and the cooling period from about 4 minutes to about 10 minutes; and the temperature in the preheating zone should be less than about 1000° C. (about 1800° F.) but gradually rise toward that temperature, the temperature in the bloating zone should be between about 1000° C. and 1260° C. (about 1800° F. to 2300° F.) and the temperature in the cooling zone should decrease gradually from the final temperature of the bloating zone toward room temperatures.

When the mass of our pebbles is introduced into the preheating zone in the kiln, the surface of each pebble is exposed to the heat treatment long before the interior becomes hot enough to begin the evolution of interior gases. For this reason there is formed on the surface of each pebble a very strong outer shell, the thickness of which is controlled by the time during which the pebble is kept in the preheating zone. This time can be adjusted according to the required strength and the required lightness of the aggregate. It must be remembered, however, that at the higher temperature end of the preheating zone several parallel processes are taking place including:

(a) A faster expansion of gases; and
(b) The development of a thicker solid outer shell.

The longer the mass of aggregate is kept in the preheating zone the thicker the outer shell of each pebble will be. It is possible to develop a shell which is in thickness at substantially every point more than half the radius of the pebble and in addition has a properly expanded interior. On the other hand, once a very thick shell has been formed in the preheating zone a much higher temperature in the firing zone will be needed to provide the required expansion. It is even possible by proper adjustment of the time-temperature ratio to develop aggregate which will have any desired expansion, for example, to develop a solid shell throughout the whole pebble (100% of shell), or to develop a highly expanded aggregate with a very thin shell, merely a surface sealed "skin." When a strong lightweight aggregate is required, the thick outer shell will be developed by holding a mass of aggregate for a longer time in the preheating zone of the kiln. When a very light aggregate is required, the mass of pebbles must be moved quite fast through the preheating zone and then kept for a longer time in the firing zone. As the total time of firing is rather short, the distinction between the heating in the preheating zone and the heating in the firing zone of the kiln must be carefully observed.

When the mass of pebbles enters the firing zone of the kiln, each pebble should by that time already have a sufficiently strong outer shell to prevent any substantial amount of the gases from the interior (which now are acquiring a considerable pressure) from escaping through the surface. The stage of incipient vitrification might be considered as the required degree of firing. Under favorable conditions the final volume of each pebble can be doubled or even tripled. Thus from one cubic yard of raw material two or more cubic yards of aggregate can be produced. When a strong (but lightweight) aggregate is required this figure will be lower. From an economical point of view it should not, however, be lower than one and one-half cubic yards of aggregate from one cubic yard of raw material. The combination of a very hard solid outer shell and a light expanded sponge-like interior is a unique feature of our aggregate. For average production, the thickness of the shell should not exceed ⅛ of the radius. We repeat that for our process the atmosphere inside the kiln should be oxidizing. It has been found during our research that an oxidizing atmosphere inside the kiln helps in developing a strong oxidized outer shell of each pebble.

The operation of cooling of the expanded mass of pebbles of our aggregate is similar to other methods applied now in the industry. The hot mass of our pebbles can be discharged from the kiln into a cooling pit where it may remain until properly annealed. While other lightweight aggregates fired to a much higher temperature must go through a cooler first and then be discharged into the cooling pit, our process saves the necessity of actual cooling equipment and its operation.

Our aggregate does not have to be crushed to the required size. Each pebble of our aggregate retains its round shape after its discharge from the kiln and therefore after cooling, the only operation necessary is to screen the whole mass of pebbles to a required size and usually the screening operation is not necessary. This fact saves expenditure on expensive crushing equipment and also saves considerable time and labor. It is also very important from the point of view of the quality of the final product as the operation of crushing invariably exposes many interior cells and, by breaking pebbles into two or more of smaller size forms a considerable amount of undesirable very fine powder-like particles. The exposure of the interior cells makes the aggregate less economical, as more cement paste has to be used to fill all the open cells, and thus the production cost of lightweight concrete is increased by the need for a greater amount of cement. Our aggregate absorbs less cement and water (i. e. has less absorption percentage). If the exterior is substantially sealed the interior cells may be comminuted without detriment to the product. However, if the exterior is porous, it is a distinct disadvantage. Therefore, in short our product has better packing qualities in the concrete mix. In addition, the lightweight concrete produced from an aggregate having a porous exterior will be much heavier when the open pores are filled with cement. With our aggregate (which has each pebble substantially sealed and which does not have to be crushed), a smaller amount of cement can be used and thus a cheaper lightweight concrete can be produced. The aggregate produced according to our process has a very dense, hard, substantially impermeable, oxidized outer shell. Due to this property our aggregate when mixed with a cement-water paste does not absorb water. Thus the dangerous phenomena of (1) "moisture movement" in concrete and of (2) "water exchange" between the cement and the aggregate, are avoided.

EXAMPLE I

We chose as a clay for forming specimens of lightweight aggregate a Bedford shale which is not a readily bloating clay but is known when fired very fast to bloat a little. The clay was delivered from a mine near Columbus, Ohio. The color of the clay was a reddish-brown (oxidized). It had the following characteristics:

1. Water of plasticity_____ About 20%.
2. Drying linear shrinkage_____ About 5–6%.
3. Drying volume shrinkage_____ About 17–18%.
4. Fired linear shrinkage_____ About 12–13%.
   (cone 02).
5. Best firing range_____ Cone 06(1841° F.), cone 1(2057° F.).
6. Overburning temperature_____ About cone 8 (2237° F.).
7. Deformation temperature_____ Cone 13(2462° F.)

*Chemical analysis*

|  | Percent |
|---|---|
| Loss on ignition | 7.0 |
| Silica, $SiO_2$ | 59.4 |
| Alumina, $Al_2O_3$ | 17.2 |
| Ferric oxide, $Fe_2O_3$ | 8.9 |
| Lime, CaO | 0.5 |
| Magnesia, MgO | 1.5 |
| Titanic oxide, $TiO_2$ | 1.2 |
| Sodium oxide, $Na_2O$ | 0.2 |
| Potassium oxide, $K_2O$ | 2.9 |
| Sulphur, S | 0.0 |
| Total carbon, C | 0.6 |

*Burning behaviour*

| Temperature | Lin. shrinkage, percent | Vol. shrink., percent | Color |
|---|---|---|---|
| Cone 08 | 1.3 | 3.9 | Buff. |
| Cone 06 | 4.1 | 11.8 | Salmon. |
| Cone 04 | 5.8 | 16.5 | Tan. |
| Cone 03 | 6.6 | 18.4 | Gray. |
| Cone 02 | 7.1 | 19.8 | Brown. |
| Cone 01 | 6.9 | 19.3 | Dark red. |
| Cone 1 | 6.5 | 18.3 | Maroon flashes. |
| Cone 4 | 6.4 | 17.9 | Dark red. |
| Cone 7 | 6.1 | 17.1 | Maroon. |

We reduced this material to particles which would pass through a 20-mesh screen. We mixed a small quantity of this clay with about 2% of an Ohio crude oil (code 358) as received from the Oil Research Laboratory of the Engineering Experiment Station of Ohio State University. The oil was an Ohio oil from Athens County having a specific gravity of 0.84. The procedure of the mixing was as follows: The necessary amount of oil was introduced from a burette (½" in diameter) to an empty laboratory mortar in such a way that the oil was sprayed over the side walls and the bottom of the mortar. Then the clay was poured into mortar and left for about five minutes. After this soaking period we mixed with a pestle for about ten minutes. When this was done the batch was left for the night, covered with a slightly moistened rag for aging and for uniform distribution of oil. The following day about 22% of water was added and the batch was mixed by hand in a large pan until we obtained the proper workability. The mixed batch of clay was pressed by hand into the cylinder of a small laboratory extruding machine and then was extruded in the form of a long, round bar. The diameter of this bar was about 9/16". After extrusion, small cylinders 1" long were cut and formed into substantially round balls or pellets. The pellets were then dried for 24 hours at room temperature and 72 hours in the laboratory drier at 180° F. Pellets were then fired. A special kiln was designed and built. This kiln was a Meeker gas fired kiln with three burners in the horizontal position to the right side wall of the kiln. A high temperature combustion tube was placed in the kiln. The length of the tube was 30", diameter 1½". The outside surface of the kiln was marked at every inch for measuring the temperature at any spot of the kiln. A moving thermocouple was used, also marked at every inch with a special refractory pencil. For moving the sample through the kiln a porcelain pusher was used which was also marked in inches. A thermocouple was connected to a potentiometer which was placed in front of the kiln. The porcelain tube was extended through the back wall of the kiln. The average rate of movement of the sample was 1" per minute. A special interval timer clock was used to measure these minute intervals. The samples were pushed by a specially prepared and marked pusher. The firing time was twenty minutes. The highest temperature was about 2200° F. At the end of the first three minutes the temperature had arisen to about 100° F. At the end of six minutes it had arisen to about 350° F. At the end of nine minutes it had arisen to about 600° F. At the end of twelve minutes it had arisen to about 1200° F. At the end of fifteen minutes it had arisen to about 1600° F. At the end of eighteen minutes it had arisen to about 2200° F. and remained there until about the end of twenty-four minutes. At the end of the twenty-seven minute period the temperature had dropped to about 1500° F. and at the end of thirty minutes it had dropped to approximately room temperature. Thus the distribution of the temperature along the tube during this firing was similar to the diagram shown in Fig. 2 of the drawings. It could be noticed that after nine minutes a small flame was observed. We found that the most critical zone was between the eight and nine minute intervals, where if samples were moved too fast cracking occurred. Once the samples passed that zone they could be moved quickly to the highest temperature zone, which in this firing was about between the eighteen minute interval and the twenty-seven minute interval. The whole firing was only for about thirty minutes and the movement during the pre-heating zone from zero to seven minutes was forced as fast as possible so that the sample could be exposed to the high temperature zone for at least five minutes. The resulting pellet as fired had a weight of 6.335 grams, a volume of 8.25 cc., saturated weight of 6.900 grams, bulk specific gravity of 0.77, the volume increased percent of 129.0, and absorption percent of 8.9, and apparent porosity of 6.8.

EXAMPLE II

We chose as a clay for forming specimens of lightweight aggregate the same Bedford shale. The clay was delivered from a mine near Columbus, Ohio. The color of the clay was a reddish-brown (oxidized). It, of course, had the same characteristics as those shown in Example I. We reduced this material to particles which would pass through a 20-mesh screen. We mixed a small quantity of this clay with about 2% of an Ohio distilled oil (code No. 151) as received from the Oil Research Laboratory of the Engineering Experiment Station of Ohio State University. The oil was an Ohio oil. The procedure of the mixing was as follows: The necessary amount of oil was introduced from a burette (½" in diameter) to an empty laboratory mortar in such a way that the oil was sprayed over the side walls and the bottom of the mortar. Then the clay was poured into mortar and left for about five minutes. After this soaking period we mixed with a pestle for about ten minutes. When this was done the batch was left for the night, covered with a slightly moistened rag for aging and for uniform distribution of oil. The following day about 22% of water was added and the batch was mixed by hand in a large pan until we obtained the proper workability. The mixed batch of clay was pressed by hand into the cylinder of a small laboratory extruding machine and then was extruded in the form of a long, round bar. The diameter of this bar was about 9/16". After extrusion, small cylinders 1" long were cut and formed into substantially round balls or pellets. The pellets were then dried for 24 hours at room temperature and 72 hours in the laboratory drier at 180° F. The pellets were then fired. The same special kiln was used and the same high temperature combustion tube was placed in the kiln. The length of the tube was 30", diameter 1½". The outside surface of the kiln was marked at every inch for measuring the temperature at any spot of the kiln. The moving thermocouple was used, also marked at every inch with a special refractory pencil. For moving the sample through the kiln the porcelain pusher was used which was also marked in inches. A thermocouple was connected to a potentiometer which was placed in front of the kiln. The porcelain tube was extended through the back wall of the kiln. The average rate of movement of the sample was 1" per minute. A special interval timer clock was used to measure these minute intervals. The samples were pushed by a specially prepared and marked pusher. The firing time was twenty minutes. The highest temperature was about 2200° F. At the end of the first three minutes the temperature had arisen to about 100° F. At the end of six minutes it had arisen to about 350° F. At the end of nine minutes it had arisen to about 600° F. At the end of twelve minutes it had arisen to about 1200° F. At the end of fifteen minutes it had arisen to about 1600° F. At the end of eighteen minutes it had arisen to about 2100° F. and remained there until about the end of twenty-four minutes. At the end of the twenty-seven minute period the temperature had dropped to about 1500° F. and at the end of thirty minutes it had dropped to approximately room temperature. Thus the distribution of the temperature along the tube during this firing was again similar to the diagram shown in Fig. 2 of the drawings. The whole firing was only for about thirty minutes and the movement during the preheating zone from zero to seven minutes was forced as fast as possible so that the sample could be exposed to the high temperature zone for at least five minutes. The finished fired product had a weight of 6.325 grams, the volume of 9.40 cc., saturated weight of 6.810 grams, bulk specific gravity of 0.68, the volume increase of 161.0% and absorption percent of 7.7, and apparent porosity of 5.2.

EXAMPLE III

We chose as a clay for forming specimens of lightweight aggregate the same Bedford shale which we used in Example I. The clay was delivered from a mine near Columbus, Ohio. The color of the clay was a reddish-brown (oxidized). It, of course, had the same characteristics as those shown in Example I. We reduced this material to particles which would pass through a 20-mesh screen. We mixed a small quantity of this clay with about 2% of an Ohio Distilled Oil (code No. 151) as received from the Oil Research Laboratory of the Engineering Experiment Station of Ohio State University. It was an Ohio oil. The procedure of the mixing was as follows: The necessary amount of oil was introduced from a burette (½" in diameter) to an empty laboratory mortar in such a way that the oil was sprayed over the side walls and the bottom of the mortar. Then the clay was poured into mortar and left for about five minutes. After this soaking period we mixed with a pestle for about ten minutes. When this was done the batch was left for the night, covered with a slightly moistened rag for aging and for uniform distribution of oil. The following day about 22% of water was added and the batch was mixed by hand in a large pan until we obtained the proper workability. The mixed batch of clay was pressed by hand into the cylinder of a small laboratory extruding machine and then was extruded in the form of a long, round bar. The diameter of this bar was about 9/16". After extrusion, small cylinders 1" long were cut and formed into substantially round balls or pellets. The pellets were then dried for 24 hours at room temperature and 72 hours in the laboratory drier at 180° F. Pellets were then fired. The same special kiln was used as in Example I and the same high temperature combustion tube was placed in the kiln. The outside surface of the kiln was marked at every inch for measuring the temperature at any spot of the kiln. The moving thermocouple was used, also marked at every inch with a special refractory pencil. For moving the sample through the kiln the porcelain pusher was used which was also marked in inches. The thermocouple was connected to the potentiometer which was placed in front of the kiln. The porcelain tube was extended through the back wall of the kiln. The average rate of movement of the sample was about 1" per minute. A special interval timer clock was used to measure these minute intervals. The samples were pushed by a specially prepared and marked pusher. The firing time was twenty minutes. The highest temperature was about 1900° F. At the end of the first three minutes the temperature had arisen to about 100° F. At the end of six minutes it had arisen to about 350° F. At the end of nine minutes it had arisen to about 500° F. At the end of twelve minutes it had arisen to about 1100° F. At the end of fifteen minutes it had arisen to about 1500° F. At the end of eighteen minutes it had arisen to about 1900° F. and remained there until about the end of twenty-four minutes. At the end of the twenty-seven minute period the temperature had dropped to about 1500° F. and at the end of thirty minutes it had dropped to approximately room temperature. Thus the distribution of the temperature along the tube during this firing was similar to the diagram shown in Fig. 2 of the drawings. The whole firing was only for about thirty minutes. The weight of the fired pellet was 6.235 g., the volume was 3.95 cc., the saturated weight was 6.625 grams, the bulk specific gravity was 1.58 and the volume increase was 9.7%, the absorption percent was 6.2, and apparent porosity was 9.9%.

It is to be understood that the above described embodiments of our invention are for the purpose of illustration only and various changes may be made therein without departing from the spirit and scope of the invention.

We claim:

1. A process of producing lightweight aggregate which comprises the steps of reducing clay-like raw materials having more than 50% combined silica and alumina by weight to particles not substantially larger than the size which will pass through a 20-mesh screen; mixing a hydrocarbon oil thoroughly with said material; subsequently mixing water thoroughly with said material of the order of about 15 to 25 parts of water by weight to 100 parts of the raw material; subsequently forming the mixture into slugs each having a volume of from 0.25 cubic inches to about 4.0 cubic inches; subsequently forming the slugs into substantially round pellets; and subsequently causing the pellets to swell by preheating the substantially round pellets slowly in an oxidizing atmosphere at a temperature which rises from room temperature to a maximum temperature between 1000° C. and 1260° C. for a period of time of about from 15 minutes to 22 minutes; maintaining the pellets in the oxidizing atmosphere and at a temperature of at least 1000° C. for a period of time of from 5 to 10 minutes to bloat the pellets.

2. A process of producing lightweight aggregate which comprises the steps of adding a crude hydrocarbon oil to dry clay-like materials having more than 50% combined silica and alumina by weight; subsequently adding water to said material of the order of about 15 to 25 parts of water by weight to 100 parts of the raw material; subsequently forming the mixture into substantially rounded pellets; and subsequently causing the pellets to swell by heating the substantially round pellets in an oxidizing atmosphere at a temperature which rises from room temperature to a maximum temperature between 1000° C. and 1260° C.

3. A process of producing lightweight aggregate which comprises the steps of reducing clay-like raw materials having more than 50% combined silica and alumina by weight to particles substantially not larger than the size which will pass through a 20-mesh screen; mixing crude hydrocarbon oil in an amount of between 2% and 5% of the material by weight thoroughly with said material; subsequently mixing water thoroughly with said material of the order of about 15 to 25 parts of water by weight to 100 parts of the raw material; subsequently forming the mixture into slugs; subsequently forming the slugs into substantially round pellets; and subsequently causing the pellets to swell by heating the substantially round pellets in an oxidizing atmosphere at a temperature which rises from room temperature to a maximum temperature between 1000° C. and 1260° C.

References Cited in the file of this patent

UNITED STATES PATENTS

| Number | Name | Date |
|---|---|---|
| 2,024,176 | Lloyd | Dec. 17, 1935 |
| 2,035,845 | Stanton | Mar. 31, 1936 |
| 2,046,071 | Harding | June 30, 1936 |
| 2,112,380 | Price | Mar. 29, 1938 |
| 2,136,096 | Benner et al. | Nov. 8, 1938 |
| 2,232,444 | Frenkel | Feb. 18, 1941 |